March 15, 1938.  T. C. MOORSHEAD  2,111,293
APPARATUS FOR FEEDING MOLTEN GLASS TO GLASS FORMING MACHINES
Filed Oct. 25, 1935  4 Sheets-Sheet 1
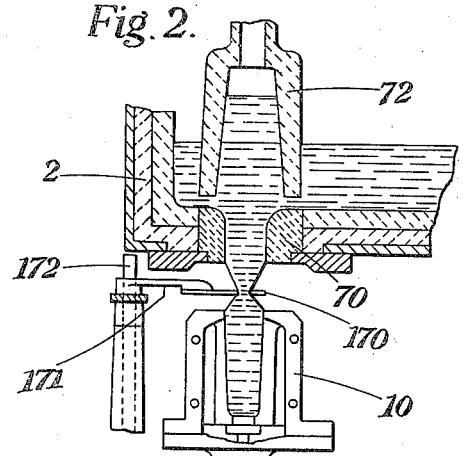
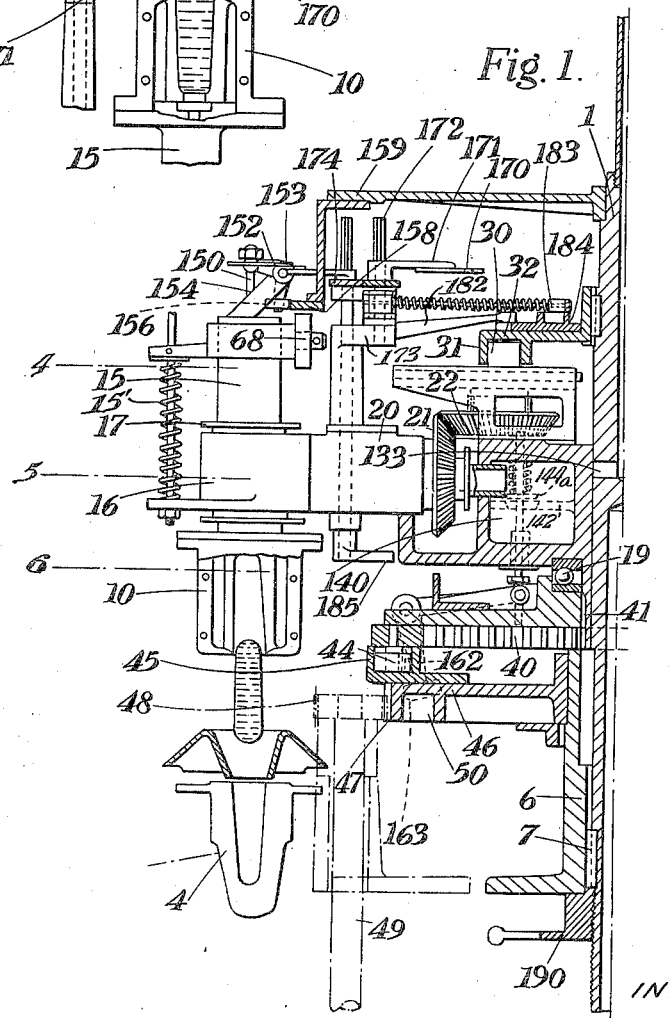
INVENTOR:
Thomas Courtney Moorshead
BY
ATTORNEY

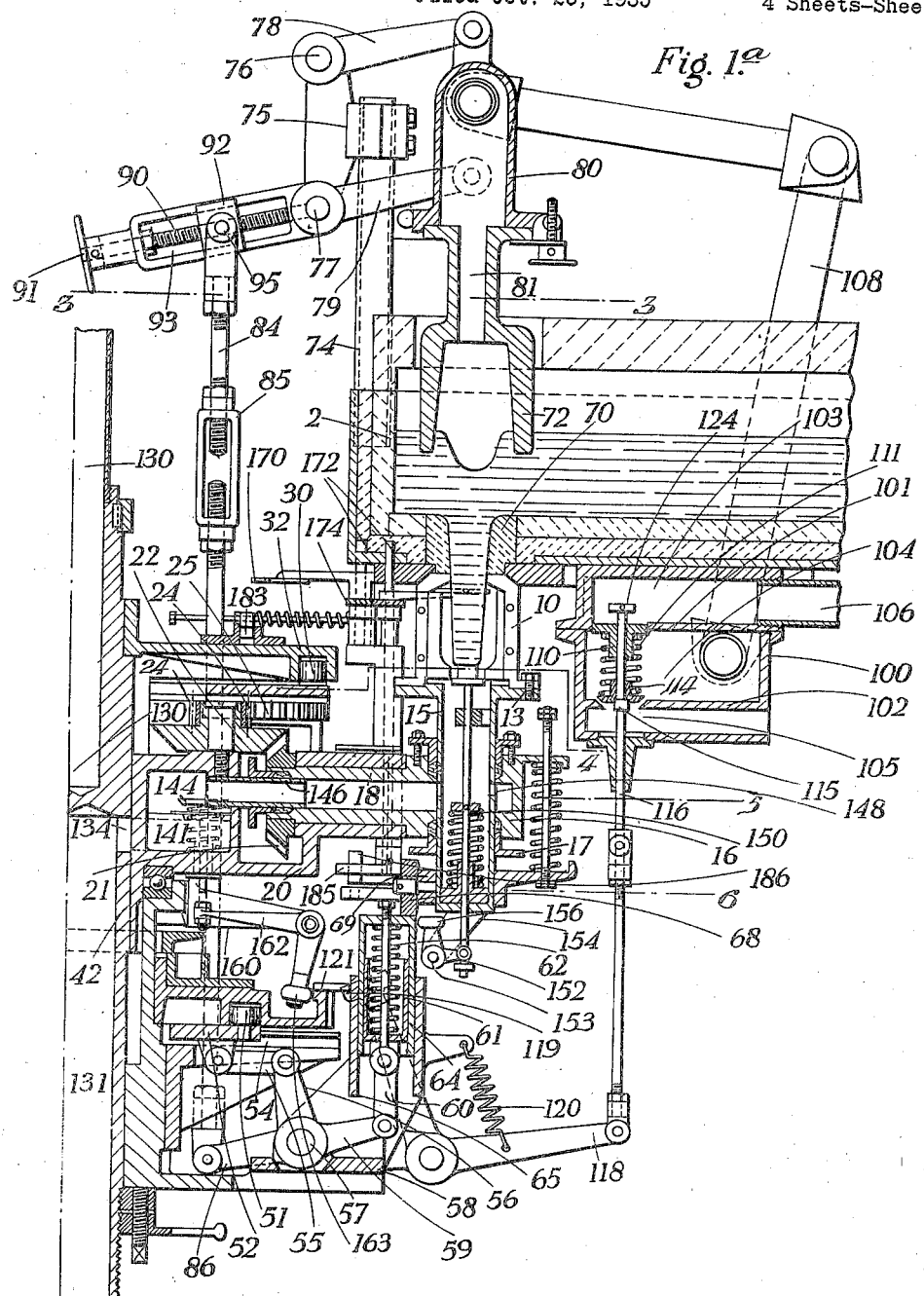

March 15, 1938.  T. C. MOORSHEAD  2,111,293
APPARATUS FOR FEEDING MOLTEN GLASS TO GLASS FORMING MACHINES
Filed Oct. 25, 1935   4 Sheets-Sheet 3

INVENTOR.
Thomas Courtney Moorshead
BY
ATTORNEY

March 15, 1938.  T. C. MOORSHEAD  2,111,293
APPARATUS FOR FEEDING MOLTEN GLASS TO GLASS FORMING MACHINES
Filed Oct. 25, 1935  4 Sheets-Sheet 4

INVENTOR
THOMAS C. MOORSHEAD
BY
Bönnelycke, Young, Emery & Thompson
ATTORNEYS

Patented Mar. 15, 1938

2,111,293

UNITED STATES PATENT OFFICE 2,111,293

APPARATUS FOR FEEDING MOLTEN GLASS TO GLASS FORMING MACHINES

Thomas Courtney Moorshead, London, England, assignor to The United Glass Bottle Manufacturers Limited, London, England, a British company Application October 25, 1935, Serial No. 46,803
In Great Britain November 8, 1934

18 Claims. (Cl. 49—5)

This invention relates to apparatus for feeding gobs or gathers of glass to glass forming machines and has particular reference to apparatus in which molten glass is fed through a discharge outlet formed in a container or furnace extension or forehearth and into a receiver disposed beneath the orifice.

The invention is more particularly concerned with the feeding of molten glass to the press and blow types of glass forming machines. With such machines it is essential that the delivered gob of glass shall be of the proper weight which is, of course, dependent upon the nature of the ware to be produced and the chief object of the invention is to provide an improved apparatus for feeding molten glass wherein the weight of the gobs of glass delivered can be accurately controlled.

According to one feature of the invention means are provided whereby the molten glass is first delivered into a measuring vessel or cup which is essentially or pre-eminently a weight controlling element in contradistinction to a mould or shape controlling element and is subsequently transferred from the measuring vessel to a mould for shaping purposes.

According to another feature of the invention means are provided whereby the molten glass is caused to flow downwardly through the discharge orifice and into a receptacle or weight controlling vessel disposed beneath the orifice under the influence of suction applied to the interior of the receptacle or vessel and the flow of glass through the said orifice is arrested or retarded as the filled receptacle or vessel is moved away from the orifice by suction applied to the glass or a local zone of the glass in the vicinity of the discharge outlet.

In carrying the invention into effect according to one convenient mode, a weight controlling or measuring vessel is disposed immediately beneath and in axial alignment with the discharge outlet of a molten glass container or furnace extension or forehearth and the said vessel is filled with the desired amount of molten glass by applying suction to the interior of the vessel, the effect of the suction being to assist the gravitational flow of the glass and to ensure the complete and rapid filling of the charge receiving vessel. As soon as the vessel has been filled, it is preferably moved downwardly away from the orifice and the charge severed from the mass of glass in or about the discharge orifice by the usual form of shearing device. At this stage, it becomes necessary to arrest or retard the flow of glass through the discharge outlet and for this purpose, it is proposed to employ suction for applying a retractive force on the glass in the vicinity of the outlet. For instance, the furnace extension or forehearth may be equipped with a tubular or inverted cup-like element disposed over the discharge outlet and provided with suitable means for periodically creating a sub-atmospheric pressure therein, the functioning of such means being in timed relationship with the movements of the charge receiving vessels towards and away from the discharge outlet.

On moving away from the discharge outlet, the charge receiving vessel is caused to transfer its charge to a parison mould where the charge is subjected to a preliminary shaping preparatory to a final shaping and blowing in a finishing mould of the usual form. If desired, a plurality of charge receiving vessels may be employed so that one may be filling whilst another is delivering its charge to a parison mould and the said vessels may be mounted upon a rotatably mounted table or arm so that each is successively brought into position for filling beneath the discharge orifice.

In order that the said invention may be clearly understood and readily carried into effect the same will now be more fully described with reference to the accompanying drawings, in which:—

Figures 1 and 1a taken together show a vertical sectional view through one form of glass feeding means incorporating the invention.

Fig. 2 is a detail fragmentary view illustrating the shearing operation.

Fig. 3 is a sectional plan view taken on the line 3—3 of Fig. 1a.

Fig. 4 is a sectional plan view taken on the line 4—4 of Figs. 1 and 1a.

Fig. 5 is a sectional view taken on the line 5—5 of Figs. 1 and 1a.

Fig. 6 is a sectional view taken on the line 6—6 of Figs. 1 and 1a.

Figure 4:
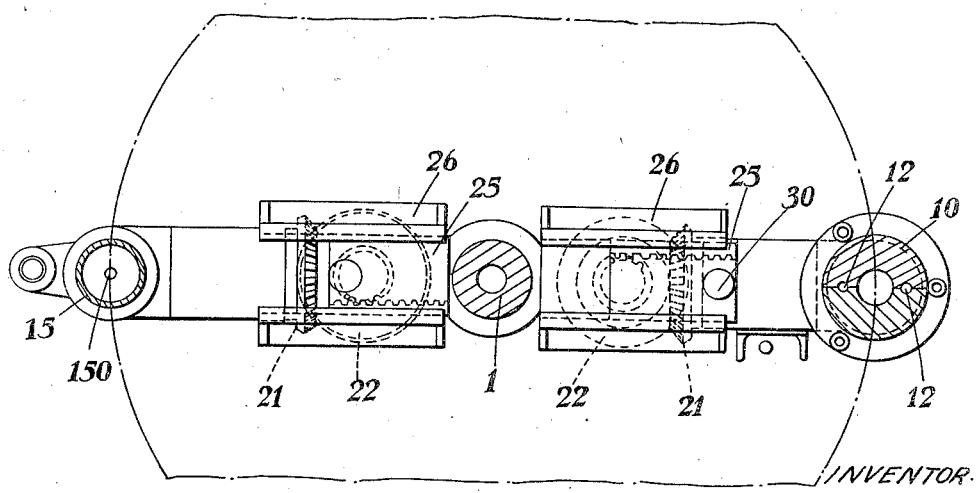
Figure 5:
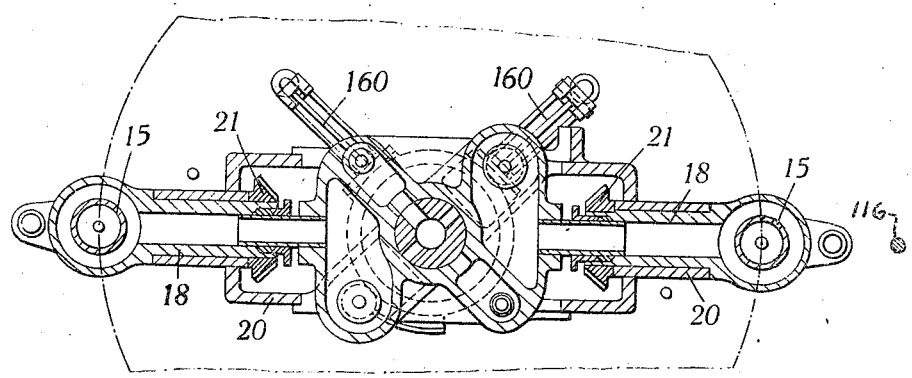

The feeding means illustrated in the accompanying drawings comprises a central stationary column 1 disposed in a suitable position between a furnace forehearth or boot, a portion of which is indicated at 2, and a glass forming machine one of the blank or charge receiving moulds of which is indicated at 4. Rotatable or angularly displaceable around the stationary column is a plurality of measuring vessels or weight controlling cups 10 of a capacity suitable for the moulds to be filled. The weight controlling cups are preferably arranged for oscillatory movement and, in the embodiment illustrated, there are two such cups adapted to be swung through 180° in such a manner that they are filled and discharged alternately. The cups are provided with vacuum or compressed air receiving grooves 12 (Fig. 4) of known form.

The cups are each suitably secured, as by bolts 13, to one of a pair of rams or sleeves 15 mounted for vertical sliding movement within a pair of carriers 16, the joints between the carriers and the rams being fitted with stuffing boxes 17. A spring 15' is provided to urge the ram 15 to a retracted position. In addition, each carrier is formed with an inwardly extending and horizontally disposed spigot 18 journalled in a turntable 20 mounted for oscillatory movement around the central stationary column, the lower end of the turntable being supported by ball or roller bearings 19 carried by an upwardly extending sleeve 6 secured at its lower end by a key 7 to the central column.

The aforesaid spigots 18 are displaceable angularly about their horizontal axes so that the ram 15 and the cup carried thereby can be inverted and, for this purpose, each spigot is provided at its inner end with a bevel gear 21 meshing with a second bevel gear 22 journalled in the upper portion of the turntable 20, the latter bevel gear being formed integral with or secured to a pinion 24 engaging a rack 25 formed on or carried by a horizontal slide supported in guides 26 formed in an outwardly extending portion 27 of the turntable 20. The upper side of the aforesaid slide is fitted with a cam roller 30 engaging a cam groove 31 formed in the underside of a cam plate 32 which is keyed to the upper part of the central column, the formation of the cam groove being such that, as the turntable is swung through 180° in a horizontal plane, the rack 25 will be displaced and the gears 21 and 22 rotated to invert the ram 15 and the cup which is carried thereby.

Figure 6:
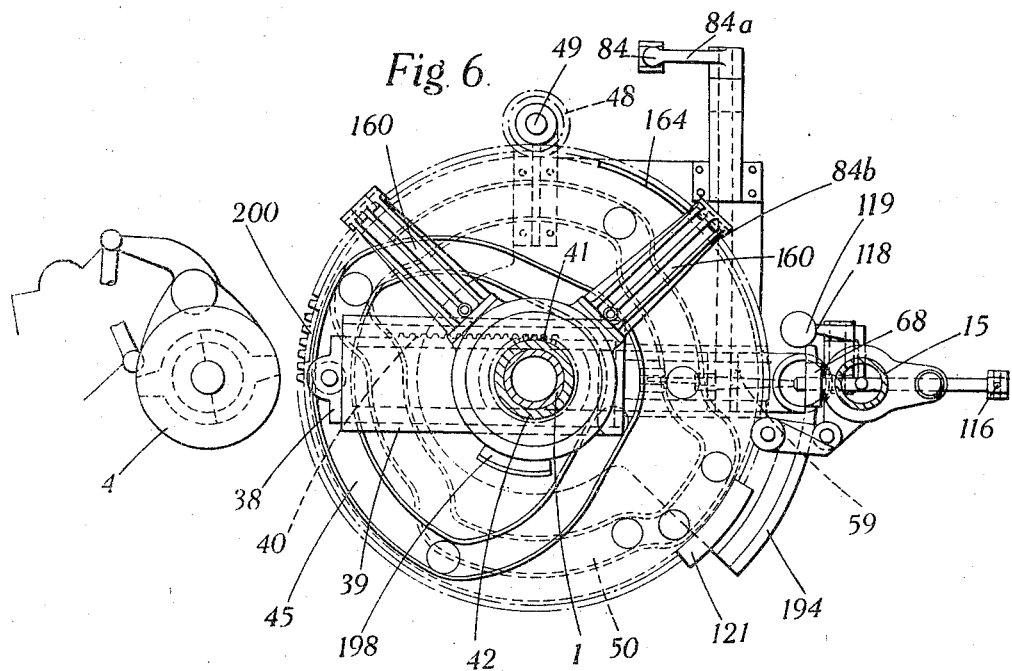

The means for oscillating the turntable 20 comprise a slide 38 arranged for horizontal movement in guides 39 supported by the fixed sleeve 6, said slide being formed with a rack 40 engaging with teeth 41 formed upon a downwardly extending sleeve portion 42 of the turntable. The said slide is also provided on its underside with a cam roller 44 engaging with a cam groove 45 formed upon the upper surface of a continuously rotating cam plate 46 the peripheral edge of which is provided with gear teeth 47 meshing with a pinion 48 carried by a vertically disposed shaft 49 which is driven continuously from the glass forming machine or other suitable source. The cam plate 46 is rotatably mounted on a part of the fixed sleeve 6 and, as will be seen from Fig. 6, the cam groove 45 is formed with a concentric portion adapted to provide for a period of rest between successive movements of the turntable.

Suitable means are also provided for raising and lowering the rams 15 and the cups which are carried thereby. For this purpose the continuously rotating cam plate 46 may be formed with a second cam groove 50 on the underside thereof, the said groove accommodating a cam roller 51 carried by a slide 52 arranged for horizontal movement in guides formed in a bracket 54 secured to the sleeve 6. To the underside of the slide 52 is pivoted a link 55 coupling the slide to a bell-crank lever 56 pivoted at 57 to an outwardly extending portion or flange 58 of the sleeve 6. Also, the outer end of the arm 59 of the bell-crank lever is coupled by a link 60 with a vertically disposed ram raising slide 61 which is hollow and accommodates a spring 62 bearing at its upper end against the end wall of the bore of a cylindrical member 64 which surrounds the ram raising slide and which is, in turn, slidably mounted in vertical guides 65. Over the upper end of the member 64 is arranged a roller 68 carried by an arm 69 extending outwardly in a horizontal direction from the lower end of the ram 15. The cam groove 50 is shaped so that, at the appropriate time, it is adapted to operate the slide 52 to cause the lever 56 to be displaced and the slide 61 to be raised by an amount sufficient to bring the member 64 into contact with the lower end of the ram roller 68 and yieldingly to raise the said ram and the cup carried thereby so as to press the upper end of the latter into contact with a seating formed in the underside of the discharge orifice 70 provided in the bottom of the furnace forehearth or boot.

The forehearth or boot is also equipped with a refractory inverted suction cup 72 suspended from a frame or linkwork so that its lower open end is below the surface of the glass in the boot and can be moved toward and away from the orifice 70. For example, the boot may be provided with a pillar 74 having adjustably mounted thereon a bracket 75 providing two pivotal points 76 and 77 for a parallel motion linkwork made up of levers 78 and 79 serving to constrain the movements of the cup 72 to a substantially vertical path. The cup is preferably carried by a hollow member 80 pivoted to the free ends of the levers 78 and 79 and, for the purpose of establishing communication between the interior of the cup and the interior of the member 80, the base or stem portion of the cup is formed with a central passage 81. The lever 79 is extended beyond its pivotal support and is connected with the upper end of a connecting rod 84 provided with a turnbuckle 85 and connected at its lower end by a lever 84a and a shaft 84b (Fig. 6) with an extension 86 of the bell crank lever 56, the arrangement being such that the suction cup 72 will be moved downwardly towards the orifice 70 as the ram raising slide is lowered to permit the cup 10 to move downwardly away from the orifice. The connection between the lever 79 and the connecting rod 84 is preferably an adjustable one and may include a screw 90 rotatably mounted in the lever 79 through the medium of a handwheel 91, said screw carrying a nut 92 slidable in a slot 93 in the lever and provided with pins 95 from which the connecting rod is suspended.

The suction cup 72 is also provided with means for placing the same in communication with a source of vacuum. For this purpose, a valve box 100 may be fitted in position on the underside of the boot, said valve box being provided with two internal partitions 101 and 102 subdividing the same into three compartments 103, 104 and 105, the upper compartment 103 being provided with a conduit 106 communicating with a source of vacuum and the lower compartment 105 being connected to atmosphere. The intermediate compartment 104 is connected with the interior of the hollow member 80 by a conduit 108 and communication between the compartments 103 and 104 is controlled by a vacuum valve 110 normally held to its seating by the suction effect and by a spring 111 which is interposed between the vacuum valve and an atmospheric valve 114 arranged beneath the vacuum valve to control communication between compartments 104 and 105. In the position shown in Fig. 1a, the atmospheric valve 114 is held off its seating by a shoulder 115 formed on a valve spindle 116 which extends upwardly through the valves 110 and 114 and has its lower end connected to one end of a bellcrank lever 118 pivoted to a bracket carried by the sleeve 6, the bell crank lever being yieldingly maintained in the position shown by a spring 120. The other end of the bell crank lever 118 is provided with a roller 119 adapted to be engaged by a cam patch 121 carried by the continuously rotating cam plate 46 so that, at the appropriate time, the lever 118 will be moved downwardly in opposition to the spring 120 thus causing also a downward movement of the valve spindle 116. At its upper end the said spindle is provided with a shouldered portion or flange 124 so that, upon a downward movement of the said spindle, the vacuum valve 110 will be opened whilst the atmospheric valve 114 will be pressed on its seating by the compression of the spring 111 thereby placing the compartment 104 and the interior of the suction cup 72 in communication with the source of vacuum.

Means are also provided for placing the interiors of the weight controlling or gathering cups 10 in communication with a source of vacuum and a source of pressure, e. g. compressed air. For this purpose, the central stationary column may be made hollow and divided into two chambers 130 and 131, the upper chamber 130 being connected with a source of compressed air and the lower chamber being connected with the source of vacuum. The wall of the column is also formed with suitable ports 133 and 134 adapted, at the appropriate time, to be brought into registration with the other ports formed in the turntable 20 so as to enable communication to be established with vacuum and compressed air chambers formed in said turntable. As may be seen from Figs. 1 and 1a, the turntable is formed with two chambers 140 and 141 each divided into two compartments by a horizontal partition 142 provided with a valve 144 or 144a, the upper compartment of each chamber being provided with a pipe 146 connecting the same, with the bore of the spigot 18 which forms part of the carrier in which ram 15 is slidably mounted. The said ram is also made hollow and the wall thereof is formed with a port 148 which, when registering with the bore of the spigot, places the chamber in the turntable in communication with the interior of the ram. Within each of the rams is slidably mounted a plunger 150 one end of which enters an opening formed for its reception in the bottom of the weight controlling cup whilst the other end thereof projects outwardly through an opening formed in the end of the ram and is connected with one arm of a bell crank lever 152 pivoted at 153 in a bracket 154. The other arm of the bell crank lever is provided with a roller 156 adapted, when the ram and cup are inverted as shown at the left hand side of Fig. 1, to engage a fixed cam 158 carried by a plate 159 secured to the upper part of the central stationary column. In addition, the central column is provided with a pair of radially disposed brackets 160 (see Fig. 6) pivotally supporting a pair of bell crank levers 162 one arm of which is provided with a roller 163 for engagement with the cam patches 164 carried by the continuously rotating cam plate 46 whilst the other arm is arranged so that, at the appropriate time, it is adapted to open the valve 144 or 144a.

The feeder is also equipped with shearing means consisting of two pairs of shearing knives 170 carried upon the outer ends of four horizontally disposed arms 171 which are secured to the upper portions of four vertically disposed spindles 172 which are journalled in pairs in brackets 173 carried by the turntable 20. The two spindles of each pair are geared together by gear wheels 174 and secured to one of the spindles of each pair is an arm 175 coupled to a rod 176 having a spring 177 disposed therearound so that it is interposed between the outer end of the arm 175 and the outer end of a lever 180 which is slidable on the rod 176. The other end of the lever 180 is pivotally mounted at 181 in a bracket 182 secured to one of the brackets 173 and intermediate its ends the lever is provided on its underside with a cam roller 183 running in a cam groove 184 formed upon the upper surface of the fixed cam plate 32. Also, one of each pair of the vertical spindles 172 is continued downwardly to the underside of the turntable 20 and has secured to its lower end a radial arm 185 disposed in such a position that it is adapted to be engaged by a stop 186 carried by ram 15 when the latter is raised as hereinafter described. The shearing knives are arranged so that they can be adjusted vertically to suit varying heights of weight controlling cups and vertical adjustment of the complete feeding device to allow for varying heights of the weight controlling cups is provided for by a handwheel 190 which is screw-threaded on the lower portion of the central column and bears against the underside of the sleeve 6.

The operation of the feeder will be evident from the following description:—The weight controlling cups are oscillated between their filling and discharging positions and the arrangement is such that one cup is being filled whilst the other is being discharged. The oscillating movements are obtained from the continuously rotating cam plate 46, the cam groove 45 and the cam roller 44, the latter imparting a horizontal reciprocating movement to the rack 40 which, through the gear teeth 41 on the sleeved portion 42 of the turntable, serves to oscillate the latter through 180° with dwell periods therebetween. During the movement of a weight controlling cup into a position beneath the orifice 70, the cam groove 184 formed in the upper surface of the fixed cam plate 32 causes the lever 180 associated with that cup to be swung about its pivot towards the position shown at the right hand side of Fig. 3. In addition, the roller 68 on the lower end of the ram 15 is brought into engagement with a stationary cam track 194 (Fig. 6) the upper surface of which is inclined upwardly and thus raises slightly both the roller and the stop 186 so that the latter is brought into a position adjacent the arm 185 to prevent rotation of the arm and of the spindle 172 by which it is carried. Under these conditions, the lever 180 is prevented from swinging the shearing knives and, consequently, it compresses the spring 177 as indicated at the right hand side of Fig. 3.

Upon coming to rest under the orifice 70, the weight controlling cup is pressed into contact with the mouth thereof by the action of the continuously rotating cam plate 46 and the cam groove 50 formed therein, the latter serving to displace the slide 52 and the bell-crank lever 56 so that the ram 15 is raised into the position shown at the right hand side of Fig. 1. At the same time and by the same means, the suction cup 72 is raised into its upper position shown in Fig. 1 by the operation of the bell-crank lever extension 86, connecting rod 84 and the parallel-motion linkwork 78 and 79. The vacuum valve 144 is now opened by the action of the cam patch 164 displacing the bell-crank lever 162 thereby establishing communication between the vacuum chamber 131 and the interior of the weight controlling cup through port 134, chamber 141, pipe 146, the bore of spigot 18, port 148 and the interior of the ram 15. The result of the opening of the vacuum valve is that a charge of glass is drawn downwardly through the orifice 70 to fill the weight controlling cup. Almost immediately after the opening of the vacuum valve, the cam groove 50 in the continuously rotating cam plate 46 displaces the slide 52 and the bell-crank lever to cause the connecting rod 84 to be raised and the suction cup 72 to be lowered into the position shown in Fig. 2. Also, the ram 15 is lowered and the charged weight-controlling cup moves away from the orifice. At this time, the cam patch 121 on the continuously rotating cam plate 46 is brought into operation to displace the bell-crank lever 118 in a clockwise direction and to open the vacuum valve 110 so that communication is established between the source of vacuum and the interior of the suction cup through the conduit 108. Under the combined influence of this suction effect and the lowering of the weight controlling cup, the glass protruding from the orifice becomes attenuated as indicated in Fig. 2 and, as shown as the stop 186 moves into a position beneath the radial arm 185, the latter and the knife carrying spindles 172 will be released to enable the compressed spring 177 to swing the knives rapidly through the narrowing neck of glass to effect cut-off. The positions of the knives after cut-off are indicated by dotted lines in Fig. 3 and it will be observed therefrom that the knives swing through an angle of more than 90° and finally come to rest on the opposite side of the orifice. By this time, the weight controlling cup has reached its lowest position and the cam patch 164 has moved beyond the roller 163 of bell-crank lever 162 so that the vacuum valve 144 is closed. The turntable 20 is then brought into operation by the action of the cam groove 45 displacing cam roller 44 and the rack 40. The turntable is displaced angularly through 180° about the central stationary column and, during the final 40° or so of this movement, the cam roller 30 is moved radially by the cam groove 31 in the fixed cam plate 32 to cause the horizontal displacement of rack 29 and an angular movement of the spigot 18 through 180° about its horizontal axis, with the result that the ram 15 and the charged weight controlling cup become inverted.

Means are preferably provided for ensuring that the gob will be retained in the weight controlling cup until it is completely inverted and, for this purpose, the central stationary column may be provided with a cam piece 198 adapted to engage the stem of the vacuum valve 144 and to hold the latter open whilst the inversion takes place. Just prior to the turntable coming to rest at the end of its 180° movement and immediately after the inversion of the charged cup, the fixed cam 158 is brought into operation to displace the bell-crank lever 152 in a clockwise direction and thereby to raise the plunger 150 within the ram 15 and to withdraw the lower end of the plunger from the upper end of the inverted cup.

The charged cup is brought to rest immediately over one of the blank moulds of the glass forming machine and, with the cup in this position, a cam patch 200 on the continuously rotating cam plate 46 is brought into action to open the compressed air valve 144a through the medium of the bell-crank lever 162. The interior of the cup is thus placed in communication with the compressed air chamber 130 and the gob is ejected from the cup into the mould located therebeneath.

Figure 3:
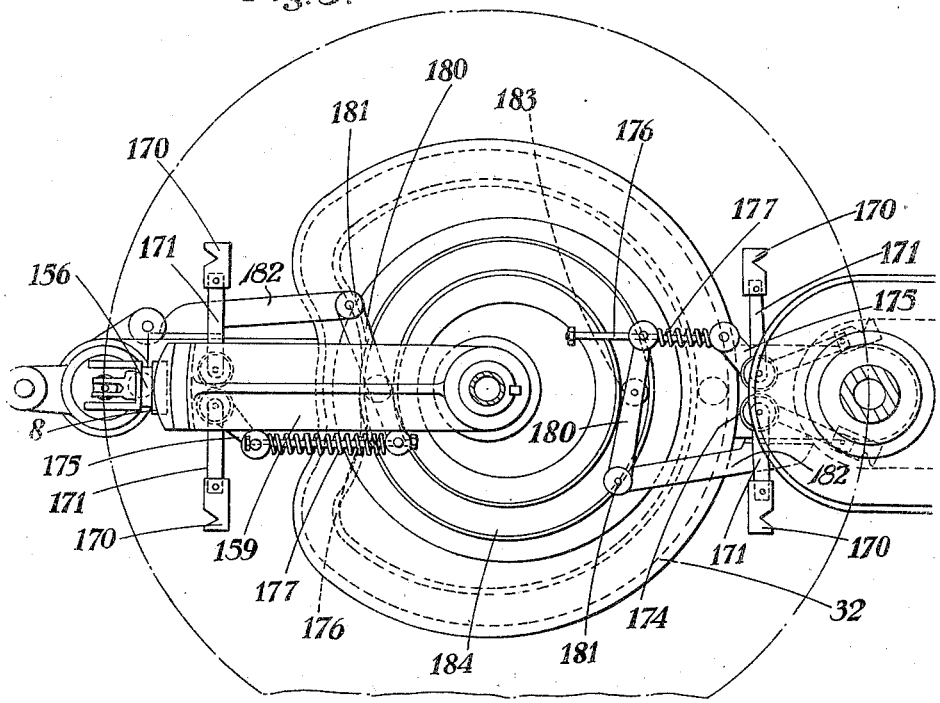

During the passage of the charged cup from its position beneath the orifice 70 into its position over the blank mould, the shearing knives 170 are returned to their full-line positions of Fig. 3 ready for the next cut-off and, at the same time, the spring 177 associated with the other cup which is being moved into its charging position is compressed and the suction cup 72 is raised again.

It will be appreciated that by the employment in the manner indicated, of a charge receiving vessel which is essentially or pre-eminently a weight controlling element, many of the difficulties hitherto experienced in the fabrication of glassware can readily be overcome. The desirability of proper weight control has frequently been referred to but, in most instances, it has been necessary, in order to produce ware of good optical appearance, to make sacrifices in this factor in favour of that of obtaining a properly shaped parison.

It will also be appreciated that the invention readily lends itself to the production of different types or weights of ware on the same machine, since the weight control factor can be taken care of entirely by charge receiving vessels of different capacities successively brought into position beneath the discharge orifice and the matter of obtaining the proper shapes of the various parisons can be attended to subsequently upon transference of the charges to the parison moulds.

Having thus described the invention what I claim as new therein and desire to secure by Letters Patent is:—

1. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate the said cam plate continuously, means for angularly displacing the turntable, the said cam plate being formed with a groove to actuate the means for angularly displacing the turntable, a plurality of cams, one of which serves to raise the cups, means for placing the interiors of the cups into communication with a source of vacuum, said means being actuated by another of said plurality of cams, means for placing the interiors of the cups into communication with a source of pressure, and a third cam serving to actuate said last-recited means.

2. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means for continuously rotating said cam plate, said cam plate being formed with a cam groove accommodating a cam roller, a horizontal slide displaceable by the said cam roller, means operable by the slide to displace the turntable angularly, a plurality of cams, one of which serves to raise the cups, means for placing the interiors of the cups into communication with a source of vacuum, said means being actuated by another of said plurality of cams, means for placing the interiors of the cups into communication with a source of pressure, and a third cam serving to actuate said last-recited means.

3. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, said turntable being formed with vacuum and compressed air chambers, vacuum and compressed air valves for the said chambers, a member rotatably mounted on said column, means for rotating said member continuously, means operated by the continuously rotating member to impart an intermittent angular movement to the turntable, and a plurality of cams, one of which serves to raise the cups, another of which serves to open the vacuum valve, and a third cam which serves to open the compressed air valve.

4. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operable by the forming machine to rotate the said cam plate continuously, means operable by the cam plate to displace the turntable angularly to move the cups from a position beneath the discharge orifice into a discharging position over a mold, cam-actuated means for inverting the cups during movement of the turntable, cam-actuated means for raising the cups, cam-actuated means for placing the interiors of the cups into communication with a source of vacuum, and cam-actuated means for placing the interiors of the cups into communication with a source of pressure.

5. An apparatus for feeding glass from the discharge outlet of a furnace forehearth to the molds of a glass-forming machine, comprising a vertical column, a turntable mounted for angular movement around said vertical column, a plurality of measuring cups carried by said turntable, a cam plate rotatably mounted on the said column, means operated by the forming machine to rotate said cam plate continuously, means operated by the continuously moving cam plate to displace the turntable angularly intermittently to move the cups between charging and discharging positions, a stationary cam plate carried by the column, and means carried by the turntable and engaging the stationary plate to invert the cups during the displacement of the turntable.

6. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operable by the forming machine to rotate said cam plate continuously, means operable by the continuously moving cam plate to displace the turntable angularly in an intermittent manner to move each cup in turn from a charging position beneath the discharge orifice into a discharging position over a mold, a stationary cam plate carried by the vertical column, means operable by the stationary cam plate to invert the cups as they move from a charging to a discharging position, and cam-actuated means for placing the interiors of the cups into communication with a source of vacuum and a source of pressure.

7. An apparatus for feeding glass from the discharge outlet of a furnace forehearth to the molds of a glass-forming machine, comprising a vertical column disposed between the forehearth and the forming machine, a turntable mounted for angular movement around said column, cup carriers formed with laterally projecting spigots journalled in said turntable, a plurality of measuring cups on said carriers, a cam plate rotatably mounted on said column, means operated by the forming machine to rotate said cam plate continuously, means operated by the continuously moving cam plate to displace the turntable angularly and intermittently to move the cups between charging and discharging positions, a stationary cam carried by said vertical column, means operable by the stationary cam to invert the cup carriers and the cups carried thereby during movement of the turntable, valve means controlling communication between the interiors of the cups and sources of vacuum and pressure, and cam-actuated means for operating said valve means.

8. An apparatus for feeding glass from the discharge outlet of a furnace forehearth to the molds of a glass-forming machine, comprising a vertical column disposed between the forehearth and the forming machine, a stationary cam carried by said vertical column, a turntable mounted for angular movement on said column, a plurality of measuring cups, a cup carrier formed with a spigot journalled in the turntable for carrying each cup, each spigot being provided with a toothed gear, means engaging with the stationary cam for actuating said toothed gear, a cam plate rotatably mounted on said column, means operated by the forming machine to rotate said cam plate continuously, and means operated by the continuously moving cam plate to displace the turntable angularly and intermittently to move the cups between charging and discharging positions.

9. An apparatus for feeding glass from the discharge orifice of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate said cam plate continuously, means operated by the continuously moving cam plate to displace the turntable angularly and intermittently to move the cups between charging and discharging positions, means for raising each cup to be charged against the underside of the discharge outlet, means for shearing the glass contained in a charged cup from the glass contained in the orifice as the former moves away from the latter, a spring for operating said shearing means, and means for compressing the spring during movement of a cup into its charging position.

10. An apparatus for feeding glass from the discharge orifice of a furnace forehearth to the molds of a glass-forming machine, comprising a vertical column, a turntable mounted for angular movement around said vertical column, said turntable being formed with vacuum and compressed air chambers, a plurality of measuring cups carried by the turntable, a continuously rotating member, means operated by the continuously rotating member to displace the turntable angularly intermittently to move the cups between charging and discharging positions, valve means controlling communication between the interiors of the cups and the vacuum chamber, valve means controlling communication between the interiors of the cups and the compressed air chamber, cam-actuated means for raising each cup as it reaches its charging position into contact with the underside of the orifice, cam-actuated means for operating the vacuum valve means with a cup in the charging position, and cam-actuated means for operating the compressed air valve means with a cup in the discharging position.

11. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate said cam plate continuously, means operated by the continuously moving cam plate to displace the turntable angularly and intermittently to move the cups between charging and discharging positions, means for raising each cup to be charged against the underside of the discharge outlet, spring-actuated means for shearing the glass contained in a charged cup from the glass contained in the orifice as the former moves away from the latter, means including a stop brought into position to prevent the operation of said spring-actuated means as a cup moves into its charging position, means for compressing said spring during the final stage of movement of a cup into its charging position, and means for thereafter releasing the said spring to actuate the shearing means.

12. An apparatus for feeding glass from the discharge orifice of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate said cam plate continuously, means operable by the rotating cam plate to move the turntable intermittently to move the cups between charging and discharging positions, cam-actuated means for raising the cups to be charged into contact with the underside of the discharge orifice, cam-actuated means for placing the interiors of the cups to be charged into communication with a source of vacuum, a suction cup having its lower end immersed in the glass in the forehearth, means for raising and lowering the suction cup, and cam-actuated means for connecting the interior of the suction cup with the source of vacuum as a charged measuring cup moves away from the orifice.

13. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, means for displacing the turntable angularly to move the cups between charging and discharging positions, means operable as a cup moves into a charging position to compress a spring, means operable as a cup moves away from a charging position to release said spring, and a shearing device operable under the influence of the released spring.

14. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, means for displacing the turntable angularly to move the cups between charging and discharging positions, a stationary cam carried by the vertical column, means actuated by said cam as a cup moves into a charging position to compress a spring, means operable as a cup moves away from a charging position to release said spring, and a shearing device operable under the influence of the released spring.

15. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, means for displacing the turntable angularly to move the cups between charging and discharging positions, cam-actuated means for placing the interiors of the cups to be charged into communication with a source of vacuum, a suction cup having its lower end immersed in the glass in the forehearth, means for raising and lowering the suction cup, and cam-actuated means for applying suction to the interior thereof as a charged cup moves away from the discharge orifice.

16. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate said cam plate continuously, means operable by the rotating cam plate to move the turntable angularly and intermittently, members capable of vertical sliding movement in the turntable for carrying said cups, and means operable to press the cups to be charged against the underside of the discharge orifice.

17. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, a cam plate rotatably mounted on said column, means operated by the forming machine to rotate said cam plate continuously, means operable by the rotating cam plate to move the turntable angularly and intermittently, members capable of vertical sliding movement in the turntable for carrying said cups, and means operable to press the cups to be charged against the underside of the discharge orifice, said vertical movable members being hollow and formed with ports for establishing communication between a source of vacuum and the interiors of the cups.

18. An apparatus for feeding glass from the discharge outlet of a furnace forehearth to the molds of a glass-forming machine, comprising a vertical column disposed between the forehearth and the forming machine, a turntable mounted for angular movement around said column, a plurality of measuring cups carried by said turntable, said column being hollow and divided into two chambers, one of which is connected with a source of vacuum and the other with a source of pressure, vacuum and compressed air chambers in the said turntable, said column having ports in the wall thereof for establishing communication between the chambers in the column and the chambers in the turntable, a continuously rotating member, and means operable by the continuously rotating member to impart an intermittent angular movement to the turntable.

THOMAS COURTNEY MOORSHEAD.